United States Patent
Barsness et al.

(10) Patent No.: US 7,606,719 B2
(45) Date of Patent: *Oct. 20, 2009

(54) POWER ON DEMAND TIERED RESPONSE TIME PRICING

(75) Inventors: Eric L. Barsness, Pine Island, MN (US); Randy W. Ruhlow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 11/947,326

(22) Filed: Nov. 29, 2007

(65) Prior Publication Data

US 2008/0086732 A1    Apr. 10, 2008

Related U.S. Application Data

(63) Continuation of application No. 10/659,976, filed on Sep. 11, 2003, now Pat. No. 7,379,884.

(51) Int. Cl.
*G06Q 10/00* (2006.01)
*G06Q 30/00* (2006.01)
*G05B 19/418* (2006.01)
*G06F 9/46* (2006.01)
*G06F 9/445* (2006.01)

(52) U.S. Cl. ............... 705/1; 705/8; 709/200; 709/203; 717/177

(58) Field of Classification Search ............... 705/1, 705/8; 709/200, 203; 717/177
See application file for complete search history.

(56) References Cited

U.S. PATENT DOCUMENTS

| | | | | |
|---|---|---|---|---|
| 6,003,061 A | * | 12/1999 | Jones et al. | 718/104 |
| 6,041,307 A | * | 3/2000 | Ahuja et al. | 705/8 |
| 7,093,004 B2 | * | 8/2006 | Bernardin et al. | 709/219 |
| 2002/0166117 A1 | * | 11/2002 | Abrams et al. | 717/177 |
| 2004/0174823 A1 | * | 9/2004 | Steele et al. | 370/252 |
| 2004/0205206 A1 | * | 10/2004 | Naik et al. | 709/230 |
| 2005/0027864 A1 | * | 2/2005 | Bozak et al. | 709/226 |
| 2006/0020573 A1 | * | 1/2006 | Galindo-Legaria et al. | 707/1 |

OTHER PUBLICATIONS

Buyya, Rajkumar et al., Economic Models for Resource Management and Scheduling in Grid Computing, John Wilet and Sons, Ltd., Revisions Jan. 6, 2002, pp. 1507-1542.*

* cited by examiner

*Primary Examiner*—John W Hayes
*Assistant Examiner*—Fadey S Jabr
(74) *Attorney, Agent, or Firm*—Patterson & Sheridan, LLP

(57) ABSTRACT

Methods, articles of manufacture, and systems for determining a fee to be charged for requests processed in a grid computing environment based. In one embodiment the fee may be determined based on the time it takes to process a request and/or pricing schedules that may vary depending on a variety of pricing criteria. In another embodiment, a completion time criterion that defines a maximum acceptable time to complete a request may be specified. If the amount of time needed to perform the request is less than the maximum acceptable time specified, returning the results may be delayed to avoid providing services valued in excess of what the customer has paid for.

6 Claims, 6 Drawing Sheets

POWER ON DEMAND TIERED RESPONSE TIME PRICING

CROSS-REFERENCE TO RELATED APPLICATIONS

This application is a continuation of U.S. patent application Ser. No. 10/659,976, filed Sep. 11, 2003 now U.S. Pat. No. 7,379,884, which is herein incorporated by reference in its entirety.

BACKGROUND OF THE INVENTION

1. Field of the Invention

The present invention generally relates to data processing and more particularly to providing fee-based computing services through a grid computing environment.

2. Description of the Related Art

The operation of a business is a dynamic undertaking. To increase profit margins, businesses continually seek out means of assessing and controlling costs. For example, one attractive alternative to outright purchases of assets is leasing of the assets. Leasing provides flexibility and, in some cases, tax advantages.

However, regardless of whether an asset is purchased or leased, some assets have periods of idleness, or decreased usage. During these periods, the assets are not productive, or not optimally productive, but still have associated costs which the business incurs. A particular asset that suffers from this problem is the computer.

Today's computers are powerful devices having significant capacity for functions such as processing and storage. Unfortunately, the cost of owning and operating computers can be significant for some businesses. In order to be effective, the computerized resources of a business must be sufficient to meet the current needs of the business, as well as projected needs due to growth. In addition, even assuming no growth, the resources must be capable of tolerating the business's inevitable peaks and valleys of day-to-day operations due to increased loads for seasonal, period end, or special promotions.

As a result, businesses are left in the position of having to invest in more computerized resources than are immediately needed in order to accommodate growth and operational peaks and valleys. In the event the growth exceeds the available computerized resources, the business must upgrade its resources, again allowing for projected growth. Thus, at any given time in its growth cycle, a business will have excess computer capacity allowing for growth as well as the peaks and valleys of short-term operations. This excess capacity translates into real cost for the business.

One conventional solution that gives user's more flexibility is on-demand access to computerized resources. Various forms of on-demand resource access are available from International Business Machines Corporation (IBM). For example, one form of on-demand access is provided by International Business Machines, Inc. under the name "Capacity on Demand" on its line of eServer computers. In any case, computerized resources are made available on-demand in response to actual needs, rather than projected needs. In one aspect, the provision of such flexibility provides a cost efficient solution to accommodate peaks and valleys that occur in any business. Increased loads for seasonal, period end, or special promotions, for example, can be responded to quickly and efficiently. A customer pays for the capacity/resources that it needs, when it is needed. As a result, the cost of computerized resources substantially matches the computerized resources actually being used, and does not include a substantial premium for excess capacity not being used. Of course, in practice, providers may attach some form of a premium to the flexibility provided by on demand resource access. However, even with such a premium, some users will realize savings.

A problem with on-demand resources, however, is that customers may still have to incur costs associated with transportation, maintenance and storage of these additional resources. Additionally, at any given time there may be idle resources available that are not being used. This may amount to a waste of resources for a service provider and/or an unnecessary expense for a customer.

Accordingly, there is a need for alternatives to providing on demand computing resources on a fee basis.

SUMMARY OF THE INVENTION

Aspects of the invention generally provide methods, articles of manufacture, and systems for determining a fee to be charged for requests processed in a grid-based computing environment. In one embodiment the fee may be determined based on the time it takes to process a request and/or pricing schedules that may vary depending on a variety of pricing criteria. In another embodiment, a completion time criterion that defines a maximum acceptable time to complete a request may be specified. If the amount of time needed to perform the request is less than the maximum acceptable time specified, returning the results may be delayed to avoid providing services valued in excess of what the customer has paid for.

A particular embodiment provides a method of providing fee-based access to grid computing resources available to a plurality of users. The method comprises receiving a request from a requesting entity; routing the request to the grid computing resources; determining an amount of time needed to perform the request by the grid computing resources; and determining a price to be charged for performing the request based on the amount of time.

Another method of providing fee-based access to grid computing resources available to a plurality of users comprises receiving a request from a requesting entity; determining a completion time criterion specified for the request, wherein the completion time criterion defines at least a maximum acceptable time to complete the request; performing the request using the grid computing resources; wherein performing the request comprises producing results responsive to the request; if an amount of time needed to perform the request is less than the maximum acceptable time to complete the request defined by the completion time criterion, delaying returning the results to the requesting entity for a period of time; after a lapse of the period of time, returning the results to the requesting entity; and determining a time-based price to be charged for performing the request.

Another embodiment provides a computerized environment comprising grid computing resources and a request manager. The request manager is configured to receive a request; route the request to an appropriate resource of the grid computing resources; and determine a price to be charged for processing the request based on an amount of time needed to process the request, wherein the price varies with respect to the amount of time needed to process the request.

Yet another embodiment provides a computerized environment comprising grid computing resources, a database and a request manager. The database contains a plurality of customer service contracts each containing a respective tiered pricing schedule defining different prices to be charged for processing requests based on time. The request manager is configured to receive requests; route the requests to appropriate resources of the grid computing resources; and access the tiered pricing schedules to determine a price to be charged for processing each request, wherein the price varies with respect to the amount of time needed to process the request.

Yet another embodiment provides a computerized environment comprises grid computing resources and a request manager. The request manager is configured to receive a request for results and determine a completion time criterion specified for the request, wherein the completion time criterion defines at least a maximum acceptable time to complete the request. The request manager routes the request to an appropriate resource of the grid computing resources to perform the request and, upon completion of the request by the appropriate resource, determines a total elapsed time since receiving the request. The manager then determines whether the total elapsed time is less than the maximum acceptable time to complete the request defined by the completion time criterion. If so, the manager delays returning the results to the requesting entity for a period of time. A price to be charged for processing the request is then determined based on an amount of time needed to process the request and return the results after the delay.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
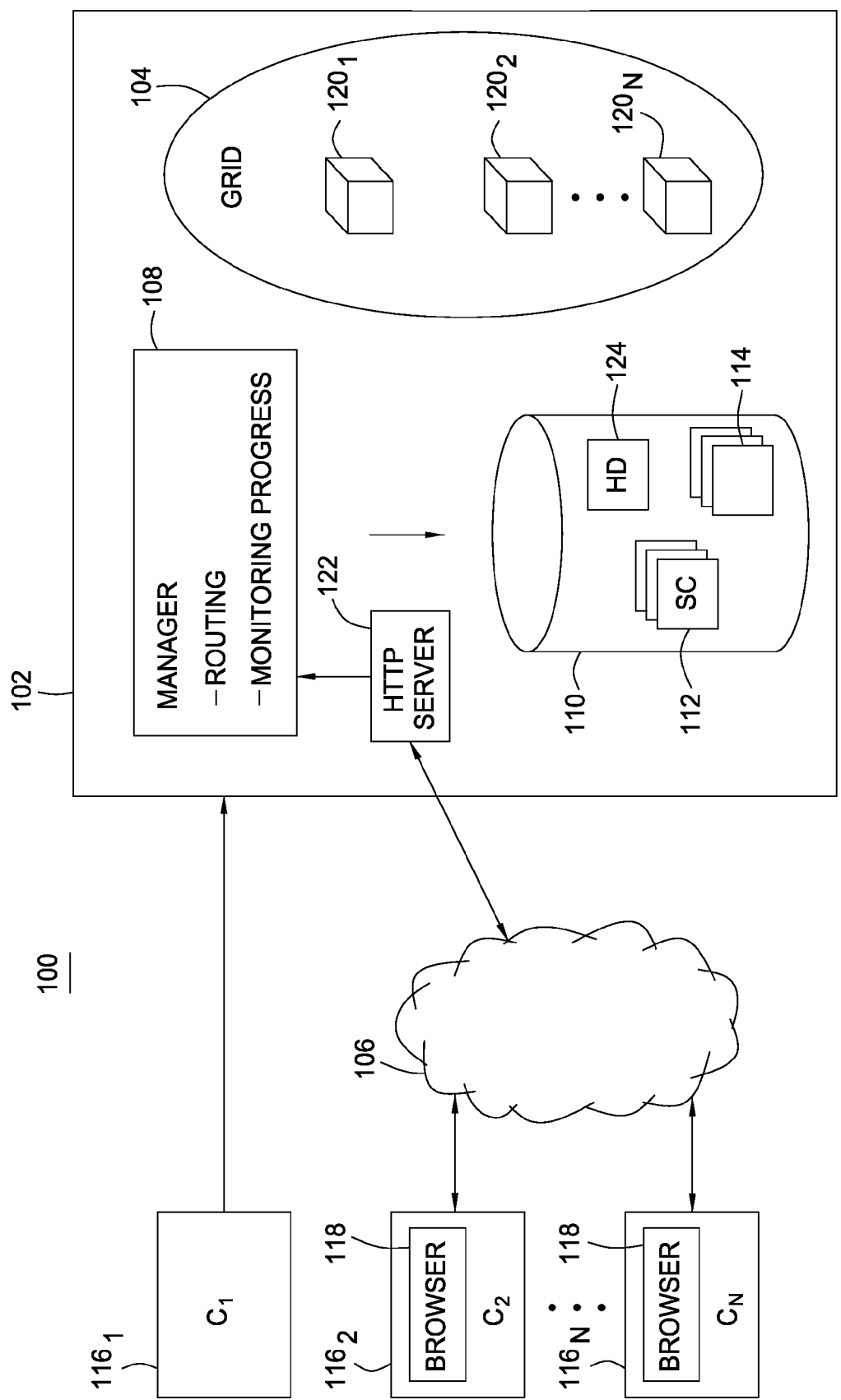
FIG. 1 is a block diagram of an environment having a provider of computing services through a grid environment, in accordance with the present invention.

The present invention is generally directed to a system, method, and article of manufacture for providing fee-based computing services through a grid computing environment. For example, a wide variety of computing resources and services may be made available to customers via a service provider. The customers may be charged a fee based on the time it takes to process a request. Different time-based pricing schedules may specify a variety of pricing criteria. In one embodiment, a completion time criterion that defines a maximum acceptable time to complete a request may be specified. If the amount of time needed to perform the request is less than the maximum acceptable time specified, returning the results may be delayed to avoid providing services valued in excess of what the customer has paid for.

It should be noted that while aspects of the invention are described in the context of a business, the invention provides advantages to any user, whether involved in a business or not.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Referring now to FIG. 1, a data processing environment 100 is shown. Generally, the environment includes a provider computer 102 and a plurality of one or more customer computers $116_1$-$116_N$. The provider computer 102 is illustratively embodied as a server computer with respect to the customer computers 116, which are, therefore, embodied as client computers. Although all computers are shown as singular entities, in practice the provider computer 102 and the client computers 116 may all be a network of computers configured to perform various functions, including those described herein. Further, the terms "client" and "server" are used merely for convenience and not by way of limitation. As such, the customer computers 116, which may be clients relative to the provider computer 102 in some regards, may themselves be servers relative to one or more other clients (not shown).

The provider computer 102 and the customer computers 116 communicate through a network 106. Illustratively, the network 106 may be any medium through which information may be transferred such as, for example, a local area network (LAN) and a wide area network (WAN), or a telephone network. The network 106 is merely representative of one communications medium. Some aspects of the invention may be facilitated by other communication mediums such as, for example, the U.S. Postal Service. For example, the customer computer $116_1$ may use other forms of communication such as snail mail, facsimile, or a telephone instead of the network 106 to communicate with the provider computer 102. Other aspects may also be practiced in the absence of any communication mediums between the provider 102 and the customers 116.

In a particular embodiment, the network 106 is the Internet. As such, the provider computer 102 may be configured with a hypertext transfer protocol (HTTP) server 122 capable of servicing requests from browser programs 118 residing on the customer computers 116. The HTTP server 122 and the browser program 118 provide convenient and well-known software components for establishing a network connection (e.g., a TCP/IP connection) via the network 106, and for receiving information from users on the computer systems 116.

Generally, the provider computer 102 provides the customer computers 116 with access to a grid 104. The grid 104 is a grid computing environment containing a number of different computing resources $120_1$-$120_N$. In one embodiment, a grid computing environment may be a type of parallel and distributed computing system which enables the sharing, selection, and aggregation of geographically distributed resources at runtime depending on their availability, capability, performance, cost, and/or user's quality of service requirements. The grid 104 may be a network of many diverse hardware and/or software computing resources including, but not limited to, applications, databases, web services, storage, computing power, and the like. These resources may be available and accessible through a network medium such as, the Internet, to a wide variety of users and may be shared between them. Access to different resources within the grid may also be provided by different service providers.

In one embodiment, the provider computer 102 is configured with a manager 108 to manage requests for grid resources from the clients 116. In one aspect, the manager 108 manages routing requests from the client computers 116 to the appropriate resources of the grid 104. At least, some of the requests are fulfilled on a fee basis, wherein the fee charged is dependant on the time needed to process a request and return a response. Accordingly, the manager 108 also monitors progress of the requests by keeping track of time spent on a particular request and calculating a cost. Although, the manager 108 is shown as a single entity, it should be noted that it may be representative of different functions implemented by different software and/or hardware components within the provider computer 102.

Generally, response pricing is determined with respect to any variety of pricing criteria including, for example, time-based criteria, request-type criteria, priority criteria, historical information, customer identification criteria, and combinations thereof. These pricing criteria are applied to define pricing schedules that the manager may access to calculate a cost for a request. In one embodiment, pricing criteria is defined in service contracts 112 stored in a database 110. A service contract may exist for each contractual customer of the provider 102 (i.e., each customer with whom the provider 102 has entered into a legal agreement). In another embodiment, pricing criteria may be specified in generic pricing schedules 114 for customers who do not have contractual agreements with the service provider. Different generic pricing schedules 114 may exist for a variety of different pricing criteria including those mentioned above (e.g., request-time criteria, request-type criteria, priority criteria, historical information, customer identification criteria, and combinations thereof). In each case, the service contracts 112 and the generic pricing schedules 114 are accessible and readable by manager (i.e., the pricing criteria are stored on computer readable media). The database 110 may also contain historical data 124 that include a log of requests received and processed in the past, with the corresponding amount of resources used and the time taken to process the request.

Figure 2:
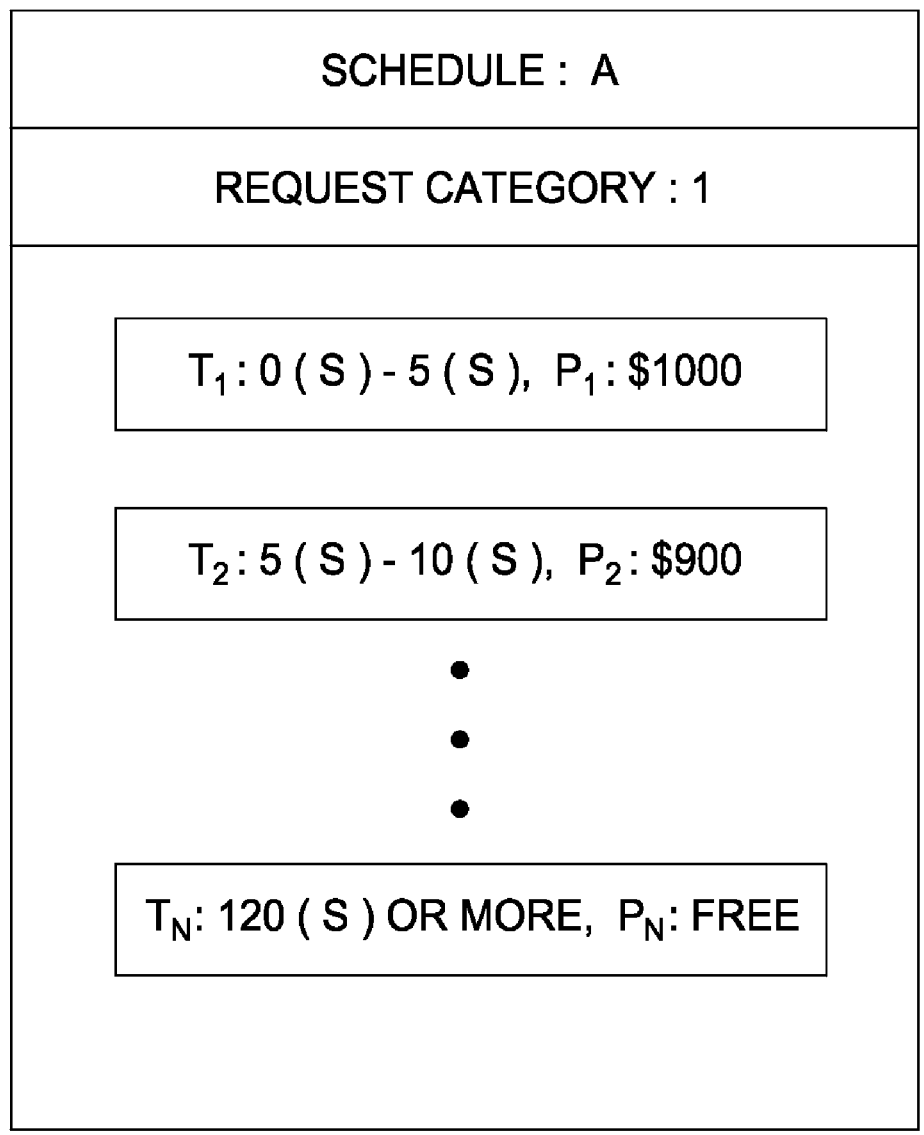
FIG. 2 is a diagram of a pricing scheme for the computing services, according to one embodiment of the present invention.

FIG. 2 is a table representative of a pricing schedule 200 that may be included in the service contracts 112 or the generic pricing schedules 114. As shown in FIG. 2, a pricing schedule A that corresponds to a request category 1 may include tiered pricing for time increments of 5 seconds. For example, if the request is completed in 0 to 5 seconds, the customer is charged $1000, but if the request is done in 5 to 10 seconds, the fee is decreased to $900, and so on. Each pricing schedule may also contain a threshold time value that when surpassed provides for free service, or alternatively for a minimal flat fee. Of course, the time increments and the corresponding prices shown are exemplary only, and the exact time periods and the corresponding prices may vary for different pricing schedules, depending on a variety of pricing criteria.

As an example, time-based criteria may provide different pricing schedules depending on when the request is processed. For example, there may be a higher fee for requests that are processed during peak time day hours, as opposed to those performed during slower times, such as late night. Additionally, request-type criteria may provide different pricing schedules based on the kind of service requested. For example, an update request may be, in general, more expensive than a read request.

Priority criteria may be supplied by the customers using a generic pricing schedule 114 or may be contained in a service contract 112 for contractual customers. The priority criteria may be used in determining when to process a customer's request. For example, if a request is specified as high priority and there is a shortage of resources, resources may be taken away from other less pressing requests to process this high priority request, as described in detail below with respect to FIG. 5. Accordingly, a pricing schedule may specify relatively higher fees to be charged for a higher priority request.

Historical information may also serve as criteria for determining a pricing schedule. The historical information may be supplied by the historical data 124 which includes information about the amount of resources and time taken to process a request in the past. The historical database 124 may be searched to determine whether a similar or same request as the request received has been processed in the past. If a similar request is located in the historical data, the information about resources used and time taken to process the request may be used to select a different pricing schedule. The pricing schedules may also vary based on customer identification criteria. As such, contractual customers may have their own customized pricing schedules defined in their service contracts. Additionally, even generic pricing schedules 114 may vary from customer to customer. For example, first time customers may be charged more than regular customers. Of course, each of the criteria mentioned above are optional, and may or may not be used in determining pricing schedules, in different embodiments. Additionally, pricing schedules may exist that take account of a combination of the one or more pricing criteria.

Figure 3:
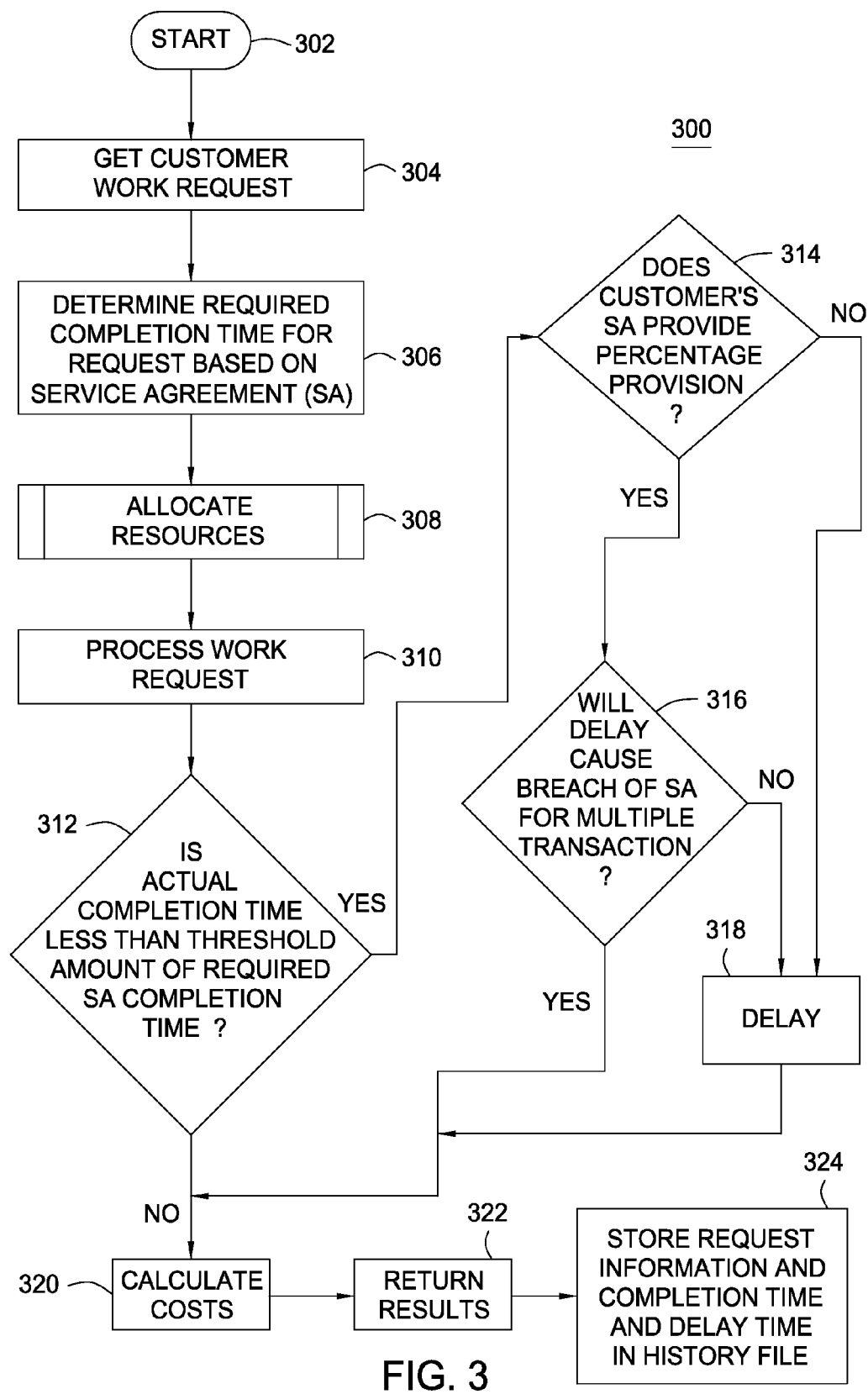
FIGS. 3 and 4 are exemplary flow diagrams illustrating the processing of a customer's request, according to one embodiment of the present invention.

FIG. 3 illustrates an exemplary method 300 for responding to a customer's request within an allowable time period. In one embodiment, the method 300 is implemented by the manager 108. The method 300 may be entered, for example, upon receiving a request from a customer (e.g., upon receiving an electronic request from the client $116_2$ via the network 106). Initially, the manager gets the customer's request (step 304) and determines the required completion time for the request (at step 306). In one embodiment, the required completion time is stipulated in the customer's service contract 112. In this regard, it is contemplated that a single completion time is stipulated for all requests, for a given customer. Alternatively, a service contract may specify completion time based on the request type, or other criteria (as described above with respect to FIG. 2). For example, a service contract may specify a first completion time for a batch processing request and a second completion time for a query to be executed against a database. In another embodiment, the completion time is specified as a parameter of the request itself, as will typically also be the case if the customer does not have a service contract with the provider and is submitting requests on the basis of the generic pricing schedules 114. The manager then allocates computing resources within the grid 104 (step 308), as described in detail below with respect to FIG. 5. The resources allocated then process the work request (step 310).

After the work request is completed, the manager determines whether the actual completion time is less than the required completion time (step 312). If the actual completion time is less than the required completion time, it may be desirable to delay returning results. That is, delaying may be done in cases where the actual completion time falls within a time period corresponding to a more expensive pricing tier than the one the customer has requested. This is so because otherwise the customer receives services valued in excess of what the customer has paid for. Such a practice will likely induce some customers to pay for the least expensive level of services in the hopes of occasionally receiving a windfall. If the manager 108 is configured to introduce a delay, the manager may first determine whether the customer's contract provides a percentage provision (step 314), in case of contractual customers. That is, some contractual customers may specify that some percentage of all requests must be processed within a predetermined time period. For example, a customer's contract might contain a provision requiring that at least 90% of all the requests received from that customer be processed in 5 to 10 seconds. Such a provision provides some flexibility for a provider in situations where not all the requests received may be performed within the required completion time. In such a case, a provider may delay a request in excess of the required completion time, as long as the percentage provision is not violated. Therefore, if the customer's contract contains a percentage provision, the manager 108 determines whether delaying the request in access of the required completion time would cause a breach of customer's service contract (step 316). If delaying would not cause a breach of contract or customer's contract does not contain a percentage agreement, then the response is delayed (at step 318). However, in cases where there is a percentage provision in the contract and delaying does not violated the provision, the delay could be in access of the required completion time, while in other cases, delay should not exceed the required completion time. Additionally, it is contemplated that if the requests are consistently returned after the exact same amount of time, then it may be too obvious to customers that results are being delayed. This problem may be solved by making the delays somewhat random, so that the return times are not too consistent. For example, if a customer requested a completion time period of 60 to 90 seconds, and the request gets completed in 50 seconds, the results may be delayed randomly for an extra 10 to 40 seconds, so that they are returned randomly within a period of 60 to 90 seconds. If the delay, however may cause a breach of contract, or the completion time is more than or equal to the contractual completion time, then costs are calculated based on the completion time and a pricing schedule (step 320). The manager then returns the results with the associated costs (step 322) and stores request-related information in a history file (step 324). Request-related information may include the work request information, resources used, completion time, delay time and the like. While, cost calculation is performed prior to returning the results in FIG. 3, those skilled in the art will recognize that alternative embodiments may provide for calculating the cost after the results have been returned, informing the customer of the amount of charge afterwards. Alternatively, contractual customers may be sent a monthly statement that includes a total cost for all service requests processed each month, instead of being notified of the cost each time they receive a result.

The foregoing discussion is directed at requests requiring returning of a result. However, it should be noted that alternative requests may not require returning results. For example, a request for batch processing (updating a database) is completed, as soon as, the database is updated, and does not require returning a result. In such cases, the results returned may be a notification that the process is complete. Delaying the return of results, in these cases, may not be valuable, as the real value is in timely performance of the request. An alternative method for delaying may be used, wherein after resources become available for processing the request, completion time is estimated based on historical data for the request, and a total completion time is calculated by adding the wait time to the estimated completion time. For example, if it takes 5 seconds for resources to become available and it is estimated that the process should take 10 seconds, the total completion time is calculated as 15 seconds. If the required completion time, in such a case, is, for example, between 20 and 30 seconds, the process may be delayed randomly between 5 and 10 seconds, to provide a total completion time of 20 to 25 seconds.

Figure 4:
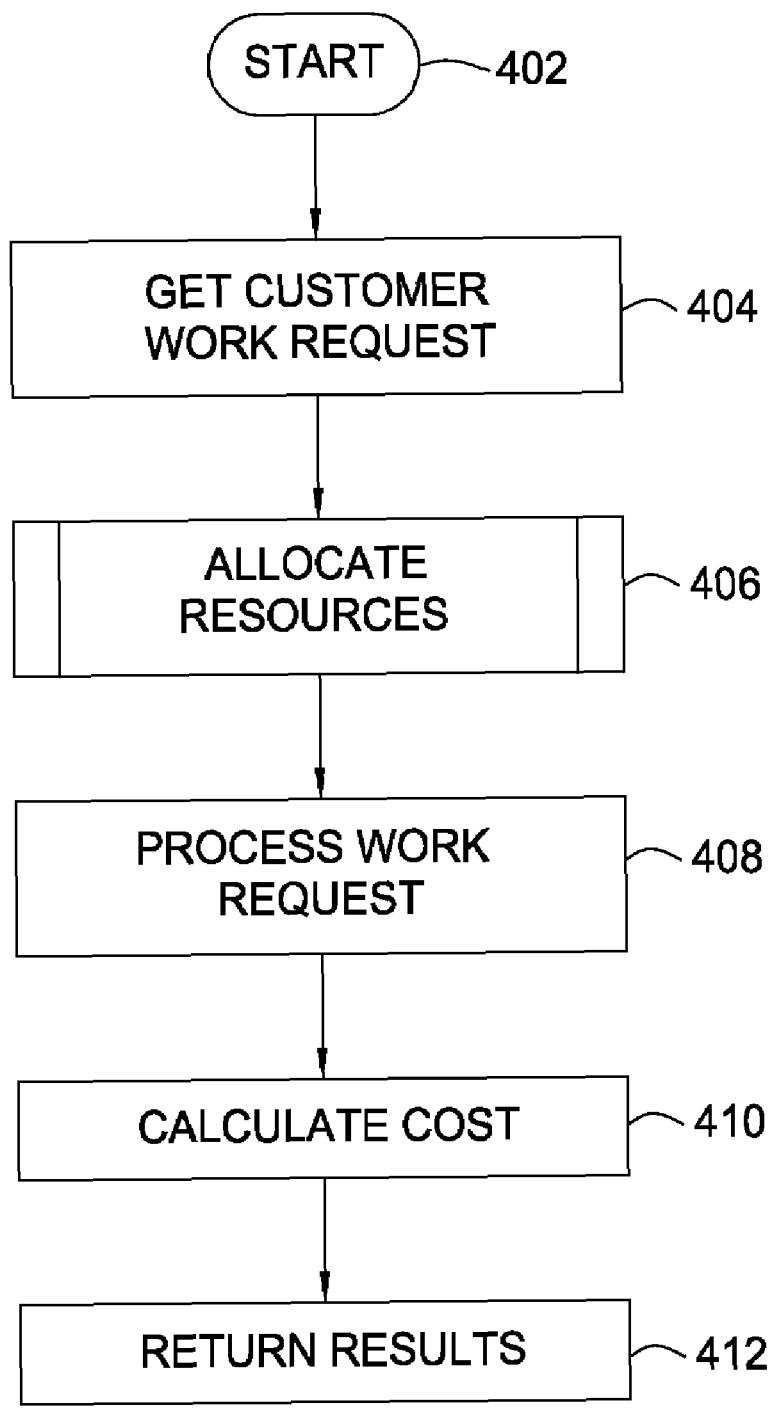

Alternatively, in other embodiments there may be no completion time specified and no delay introduced. Instead, the results may be returned as soon as they become available and the customer may be charged according to the pricing schedule and the completion time. FIG. 4 illustrates one embodiment of exemplary operations 400 for responding to a customer's request when no completion time is specified. The method 400 may be entered, for example, upon receiving a request from a customer (e.g., upon receiving an electronic request from the client 116$_2$ via the network 106). Initially, the manager gets the customer's request (step 404) and allocates computing resources within the grid 104 (step 406), as described in detail below with respect to FIG. 5. The resources allocated then process the work request (step 408). After the request is completed, the manager calculates the costs (step 410) based on the completion time and the pricing schedule. The results are then returned (step 412), or the customer is notified, if the request does not require returning of results.

Figure 5:
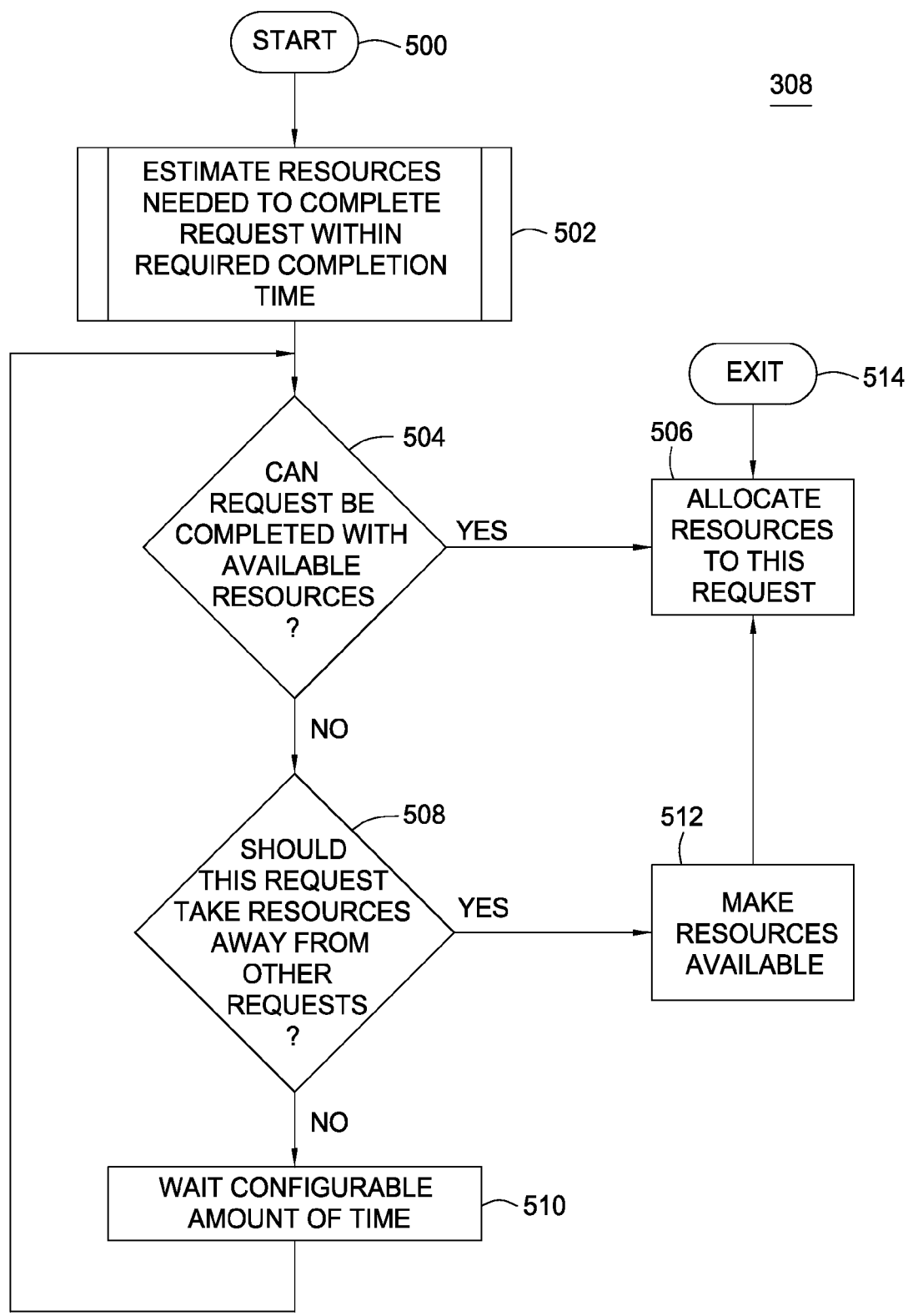
FIG. 5 is an exemplary flow diagram illustrating the allocation of resources to a customer's request, according to one embodiment of the present invention.

As previously described, resources within the grid 104 have to be allocated for each work request. FIG. 5 illustrates one embodiment of exemplary operations at step 308 for allocating resources for a work request. Upon entering the method 308, the manager estimates the resources that are needed to complete the request within the required completion time (at step 502), as described in more detail below with respect to FIG. 6. If the request can be timely completed with the available resources (step 504), the manager then allocates resources to the request (at step 506). If, however, the request cannot be timely completed within the available resources, then the manager determines whether resources should be taken away from other requests to perform this task (step 508).

In cases where the requests require more resources than are available, the provider has to balance requests from various customers. In one embodiment, the provider uses a cost-based algorithm to optimize processing the incoming requests such that the greatest profit is achieved in cases where not all request processing criteria (e.g., completion time) can be met. For example, using historical information, the provider may choose to delay a more complex request and process it at no charge (or a lesser charge, depending on the specifications of the relevant service contract) to one customer, while allowing several smaller requests from a different customer through. The historical information may be provided by the historical data 124. This data may be used to estimate the amount of resources needed, as described in detail below with respect to FIG. 6, and the time it might take to process the request, based on information from similar requests previously processed. The cost-base algorithm may also take into account any service contracts to ensure that overall customer requests would be done to meet required commitments.

Referring still to FIG. 5, if the algorithm determines that resources should be taken away from other requests, then resources are made available for the current request (at step 512) and allocated to it (step 506). If, however, the algorithm determines that resources can not be taken away from other requests, then the system waits a configurable amount of time (step 510), before going through the loop again to determine whether there are any available resources. Next iteration of step 508 may consider the amount of time a request has been waiting, in determining whether resources should be taken away from other requests. This may be done to prevent a low priority customer from having to wait forever. After resources have been allocated, the method 308 exists (at step 514).

Figure 6:
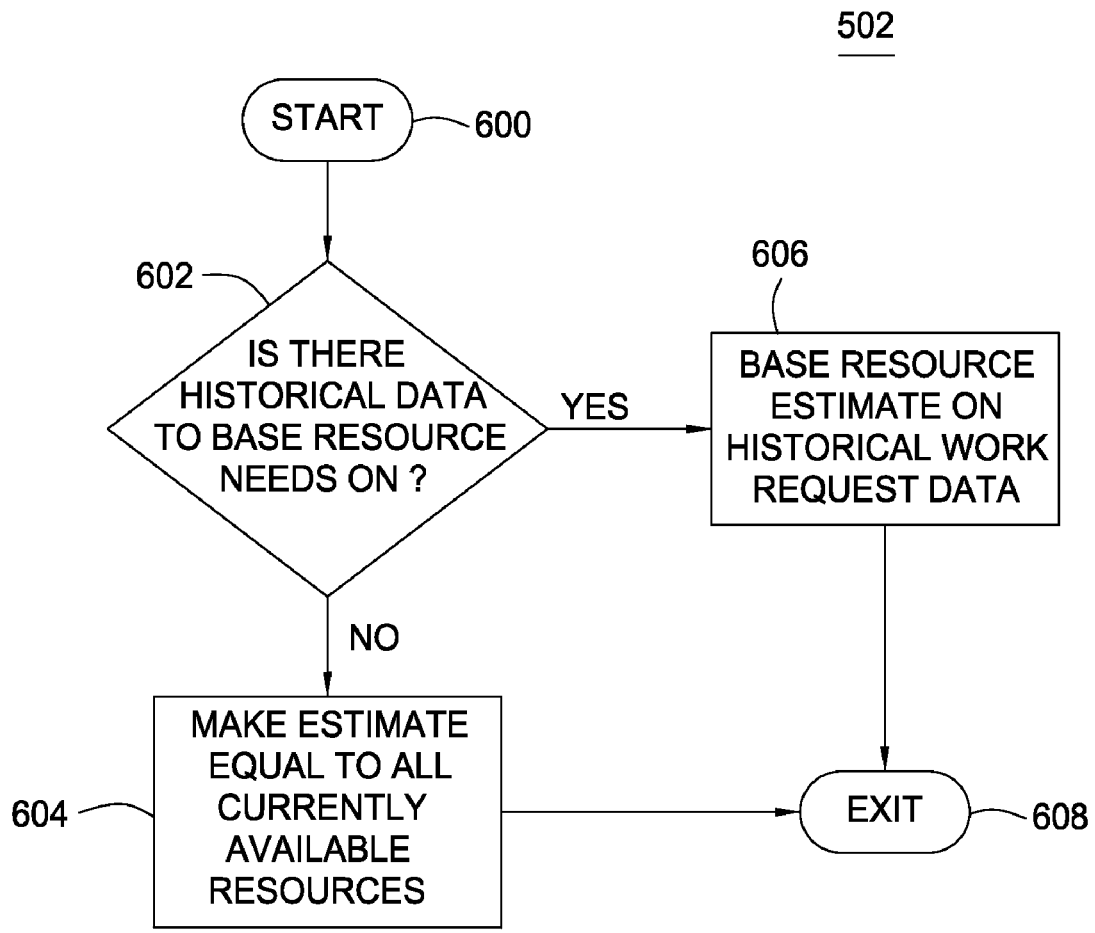
FIG. 6 is an exemplary flow diagram illustrating estimating resource needs for a customer's request, according to one embodiment of the present invention.

As described previously, the manager may estimate the resources that are needed to complete a work request (step 502). One embodiment illustrating operations performed at step 502 are shown in FIG. 6. Upon entering the method 502, the system determines whether there is historical information that the resource needs can be based on (at step 602). If there is historical data, then the resource estimate is calculated based on the information (at step 606). The historical information may be supplied by the historical data 124 as described previously. The historical database 124 may be searched to determine whether a similar or same request as the request received has been processed in the past. If a similar request is located in the historical data, the information relating to the resources used to process the request may be utilized to estimate the resources needed to complete the current request. However, if there is no historical information, then the estimate will be equal to all currently available resources (step 604) and the method exists (step 608).

While the foregoing is directed to embodiments of the present invention, other and further embodiments of the invention may be devised without departing from the basic scope thereof, and the scope thereof is determined by the claims that follow.

What is claimed is:

1. A system, comprising:
    grid computing resources; and
    a request manager, stored on a computer readable storage medium, configured to:
        receive a request for results;
        determine a completion time criterion specified for the request, wherein the completion time criterion defines at least a maximum acceptable time to complete the request;
        route the request to an appropriate resource of the grid computing resources to perform the request;
        upon completion of the request by the appropriate resource, determine a total elapsed time since receiving the request;
        determine whether the total elapsed time is less than the maximum acceptable time to complete the request defined by the completion time criterion;
        in response to determining that the total elapsed time is less than the maximum acceptable time to complete the request defined by the completion time criterion, delay returning the results to the requesting entity for a period of time; and
        determine a price to be charged for processing the request based on an amount of time needed to process the request and return the results after the delay.

2. The system of claim 1, wherein the completion time criterion defines a minimum acceptable time to complete the request, and wherein the request manager is configured to delay returning the results only if the amount of time needed to perform the request is greater than the minimum acceptable time and less than the maximum acceptable time.

3. The system of claim 1, wherein returning the results occurs before a lapse of the maximum acceptable time as calculated from receiving the request.

4. The system of claim 1, further comprising a database containing at least one tiered pricing schedule defining different prices to be charged for processing requests based on time and wherein the request manager is configured to access the at least one tier pricing schedule to determine the price for processing the request.

5. The system of claim 4, wherein the tiered pricing schedule specifies a decreasing price with to be charged for each request with at least one of: (i) an increasing request processing time and (ii) an increasing request response time.

6. The system of claim 4, wherein the tiered pricing schedule is an element of a customer service contract.

* * * * *